United States Patent
Sullivan et al.

(10) Patent No.: US 10,096,816 B2
(45) Date of Patent: Oct. 9, 2018

(54) BATTERY WITH ELECTROLYTE INTERMIXING DEVICE

(71) Applicants: IQ POWER LICENSING AG, Zug (CH); Charles Robert Sullivan, Iserlohn (DE)

(72) Inventors: Charles Robert Sullivan, Iserlohn (DE); Steffen Tschirch, Zschopau (DE)

(73) Assignee: IQ POWER LICENSING AG, Zug (CH)

( * ) Notice: Subject to any disclaimer, the term of this patent is extended or adjusted under 35 U.S.C. 154(b) by 362 days.

(21) Appl. No.: 14/647,690

(22) PCT Filed: Feb. 20, 2013

(86) PCT No.: PCT/DE2013/000092
§ 371 (c)(1),
(2) Date: May 27, 2015

(87) PCT Pub. No.: WO2014/082612
PCT Pub. Date: Jun. 5, 2014

(65) Prior Publication Data
US 2015/0311496 A1    Oct. 29, 2015

(30) Foreign Application Priority Data
Nov. 28, 2012   (DE) .................. 10 2012 023 314

(51) Int. Cl.
*H01M 2/38* (2006.01)
*H01M 10/42* (2006.01)
*H01M 10/12* (2006.01)

(52) U.S. Cl.
CPC ............ *H01M 2/38* (2013.01); *H01M 10/12* (2013.01); *H01M 10/4214* (2013.01); *H01M 2220/20* (2013.01); *Y02E 60/126* (2013.01)

(58) Field of Classification Search
None
See application file for complete search history.

(56) References Cited

U.S. PATENT DOCUMENTS

| 4,963,444 A | 10/1990 | Delaney |
| 5,096,787 A | 3/1992 | Delaney |
| (Continued) | | |

FOREIGN PATENT DOCUMENTS

| CN | 101720516 | 6/2010 |
| CN | 101743651 | 6/2010 |
| (Continued) | | |

OTHER PUBLICATIONS

Translation of JPS61016866U.*
(Continued)

*Primary Examiner* — Daniel S Gatewood
(74) *Attorney, Agent, or Firm* — Henry M. Feiereisen LLC (57) ABSTRACT

The invention relates to a battery comprising liquid electrolyte, used in moving vehicles, wherein the battery includes a battery housing comprising side walls, a housing floor and a cover, a liquid electrolyte, the level of which is within predetermined tolerance limits, electrodes, a flow channel plate arranged at least on one side wall so as to form a flow channel, wherein the upper end of said flow channel serves as exhaust port, a mixing vessel comprising a mixing vessel floor and mixing vessel side walls being arranged above the electrodes wherein the mixing vessel side wall adjoining the exhaust port is formed as an overflow the mixing vessel floor being located below the minimum level for the liquid electrolyte, which minimum level is provided for operational reasons, and at least one floor opening being provided in the mixing vessel floor.

6 Claims, 10 Drawing Sheets

(56) References Cited

U.S. PATENT DOCUMENTS

| | | | |
|---|---|---|---|
| 8,778,520 B2 | 7/2014 | Sullivan et al. | |
| 2002/0028373 A1* | 3/2002 | Tschirch | H01M 2/38 |
| | | | 429/81 |
| 2010/0279157 A1 | 11/2010 | Koch et al. | |
| 2011/0314663 A1 | 12/2011 | Bauer | |
| 2013/0202925 A1 | 8/2013 | Sullivan | |
| 2015/0311496 A1 | 10/2015 | Sullivan et al. | |

FOREIGN PATENT DOCUMENTS

| | | | |
|---|---|---|---|
| CN | 101904032 | | 12/2010 |
| DE | 29718004 | | 1/1998 |
| DE | 19823916 | | 12/1999 |
| DE | 102006021578 | | 9/2007 |
| DE | 102006038047 | | 2/2008 |
| DE | 102010021868 | | 12/2011 |
| DE | 102012110897 | | 5/2014 |
| JP | 61-013464 | | 1/1986 |
| JP | S61016866 U | * | 1/1986 |
| JP | 63-26612 | | 5/1988 |
| JP | 2010-500727 | | 1/2010 |
| RU | 2399120 | | 9/2010 |
| WO | WO 2014/082612 | | 6/2014 |

OTHER PUBLICATIONS

International Search Report issued by the European Patent Office in International Application PCT/DE2013/000092 dated Feb. 20, 2013.

\* cited by examiner

BATTERY WITH ELECTROLYTE INTERMIXING DEVICE

CROSS-REFERENCES TO RELATED APPLICATIONS

This application is the U.S. National Stage of International Application No. PCT/DE2013/000092, filed Feb. 20, 2013, which designated the United States and has been published as International Publication No. WO 2014/082612 and which claims the priority of German Patent Application, Serial No. 10 2012 023 314.0, filed Nov. 28, 2012, pursuant to 35 U.S.C. 119(a)-(d).

BACKGROUND OF THE INVENTION

The invention refers to a battery with liquid electrolyte, preferably for use in moving vehicles, such as for example in automobiles, boats or air planes, and with a device for intermixing the electrolyte.

The pursuit in the automobile industry for lightweight construction also refers to saving in battery weight. At the same time the demand for greater battery power is increasing, since aside from the conventional energy needed, for example, to start an automobile, energy for additional aggregates, such as electrical window cranks, control motors for changing seat positions or also electrical heating of the seats, is required. Furthermore, it is desirable to possibly maintain the battery power at a constant high level over the life of the battery, since increasingly also security related functions, such as steering and braking are controlled and operated electrically. Battery power as used henceforth is understood as the capacity of the battery, as well as the capacity of the battery relating to electric current delivery or electric current uptake. Battery power is affected by different factors as known to those skilled in the art.

From the prior art, means are known to increase the power of a battery with a liquid electrolyte, such as for example, a lead-acid-battery. A specific problem with lead-acid batteries is the so-called stratification of the acid, that is, the acid concentration is not consistent with respect to the electrode surface. This results in the corroding of the electrodes at points of the electrode where the acid concentration is too high, thus diminishing the battery life, and at points on the electrode where the acid concentration is too low, the battery does not attain full power.

Henceforth, the electrolyte is always identified as an acid because most applications of the present invention refer to lead-acid batteries. The present invention is however applicable to any liquid electrolyte battery the electrolyte of which tends toward stratification.

Accordingly, various devices and methods were developed to intermix the acid in order for the acid concentration to be uniform. For example, in stationary batteries air is blown into the electrolyte.

For motor vehicle batteries acid some intermixing devices that exploit the mass inertia of the acid at acceleration movements are known. This technology is known to the person skilled in the art so that U.S. Pat. No. 4,963,444 and DE 297 18 004.5 are only referred to as exemplary documents.

There are starter batteries of particular high construction. With these starter batteries, the acid present in an ascending channel, must be pressed upwards from below through acceleration over a long distance and requiring a rather large amount of energy. Since the energy to move the acid in the channel is generated through the vehicle acceleration, this amount is limited.

SUMMARY OF THE INVENTION

Object of the present invention is thus to provide a battery with an electrolyte intermixing device that is so efficient that even batteries of higher construction can be well intermixed.

The object is solved by means of a battery, wherein the battery includes:

a battery housing with side walls, a housing bottom and a covering. This arrangement forms a battery cell. Normally, several such battery cells are compiled into a battery with a multi-housing. In the preferably rectangular battery housing plate shaped electrodes are arranged in vertical disposition. The electrodes are completely covered with acid.

At least at one side wall of the battery housing, at a certain distance and parallel thereto a flow channel plate is disposed, in such a way that a vertical and liquid-tight flow channel is formed between the battery housing wall and the flow channel plate. Alternative to this arrangement, the flow channel can also be formed as a double-walled flow channel plate, that is, as a very compressed tube with a port-shaped hollow space cross section.

The upper end of the flow channel thus represents an outflow port. Adjacent the out flow port a mixing trough is provided and includes a vertical sidewall and a horizontal bottom. The side wall adjacent the outflow port forms the overflow edge of the outflow port. The bottom of the mixing trough is always below the operationally intended minimum level of the acid and is provided with at least one bottom opening of a predetermined diameter.

As still further elaborated in the exemplary embodiment, upon acceleration of the vehicle and thus the battery, a certain amount of acid is pressed upwardly through the vertical flow channel so that acid exits from the outflow port via the overflow edge and into the mixing trough. Since the flow channel plate extends to the lower third portion of the acid volume and the acid there has a higher density, the acid with the higher density is thus guided into the mixing trough.

Simultaneously with the inflow of the higher density acid into the mixing trough, during acceleration, light acid, that is, acid of lower density located below the mixing trough is likewise pressed through the bottom opening into the mixing trough.

Thus, an intermixing of acid of a higher density and acid of a lower density takes place in the mixing trough.

In other words, in a battery resting position the acid of lower density is in the mixing trough, as the mixing trough is connected via the bottom opening with the acid volume of the battery. During acceleration, additional acid of lower density is pressed through the bottom opening into the mixing trough and at the same time denser acid from the lower volume area of the battery case is guided through the flow channel into the mixing trough. Accordingly, during acceleration of the vehicle and thus the battery, there is more acid in the mixing trough than in the resting state.

The intermixed acid which is in the mixing trough after the acceleration process, henceforth called mixed acid, has a slightly higher density than the acid that flowed in through the bottom opening and the acid that was already residing in the mixing trough. At reduced acceleration to a zero value, of the mixed acid now residing in the mixing trough, a greater amount flows through the bottom opening and a smaller amount flows through the flow channel back into the battery case until the normal acid level is restored again.

With the intermixing of the acid volumes of different density in the mixing trough, even with batteries of greater height construction, a substantially better intermixing is realized as compared to the conventional solutions of the prior art.

A faster recirculation of the electrolyte results in a faster temperature adjustment within the battery cell, thus increasing the life of the battery. This aspect is important, for example, when the battery is installed in the motor space of a motor vehicle and heated on one side through heat radiation from the motor. That way, the present invention has a positive effect also on standard batteries in addition to a higher battery life, as well as an improved capacity regarding electric current uptake and also electric current output.

A further improvement of the intermixing is realized when the bottom opening of the mixing trough is provided at the site at which the acid of higher density is running to the bottom of the mixing trough, that is, directly next to the outflow port. Since the overflow of the denser acid from above into the mixing trough and the inflow of the thin acid from below happens almost simultaneously, the acid volumes coming directly in contact with each other are swirled about each other and become thus well intermixed.

The interior facing wall of the mixing trough is provided with an opening, which further improves the intermixing.

A second mixing trough is provided joining the interior facing wall of the first mixing trough, wherein at last one opening is provided in the bottom of the second mixing trough. This further improves the intermixing.

The bottom of the second mixing trough is located at the level of the maximum level of the acid, that is, the bottom of the second mixing trough is higher than the bottom of the first mixing trough. Thereby the intermixing is further improved.

BRIEF DESCRIPTION OF THE DRAWING

The present invention is more closely described by means the following example of an embodiment.

DETAILED DESCRIPTION OF PREFERRED EMBODIMENTS

Figure 1:
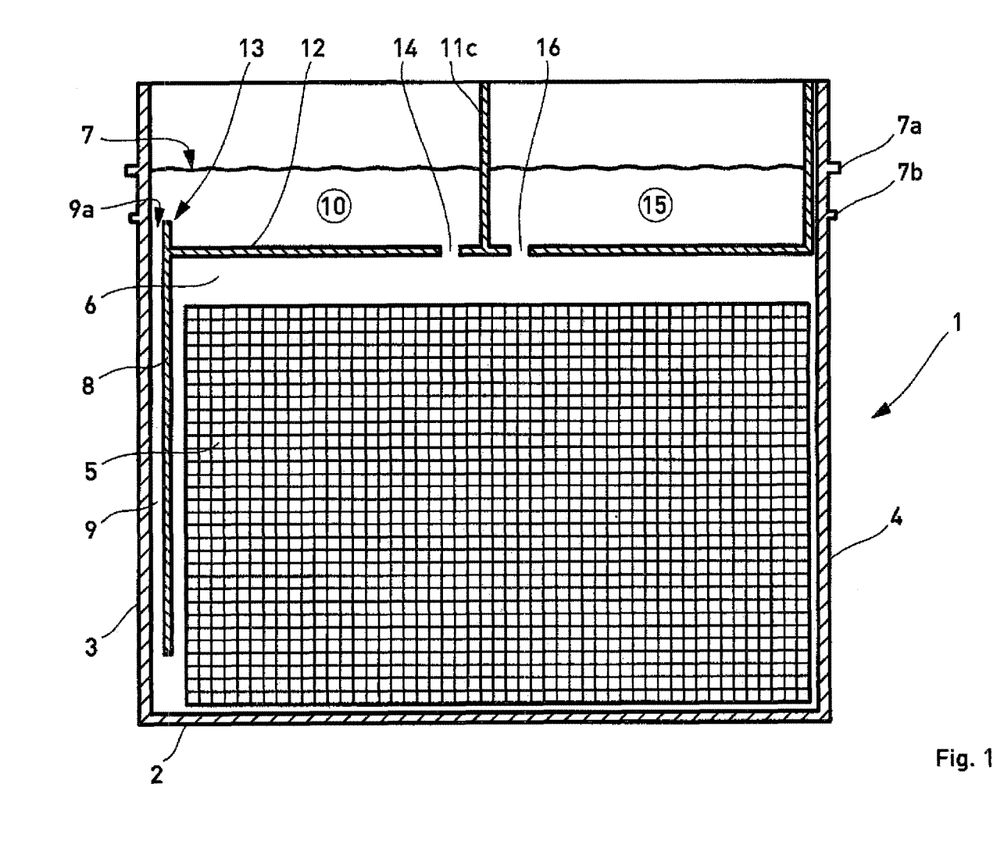
FIG. 1 shows a cross section view of a battery case cell and the acid levels in a first phase.

FIG. 1 shows a cross section view of a battery case cell. The battery case cell 1 has a rectangular cross section with a bottom 2 and four side walls, wherein this illustration shows only side walls 3 and 4. Reference numeral 5 designates the plate-shaped electrodes and reference numeral 6 designates the battery acid, whose level 7 is between a maximum level 7a and a minimum level 7b. As seen in the drawing, the level shown there is at the mark of the maximal level 7a.

Between the side wall 3 and the electrodes 5, a flow channel plate 8 is vertically disposed thus forming a flow channel 9. The end of the flow channel 9 thus forms an outflow port 9a.

Figure 8:
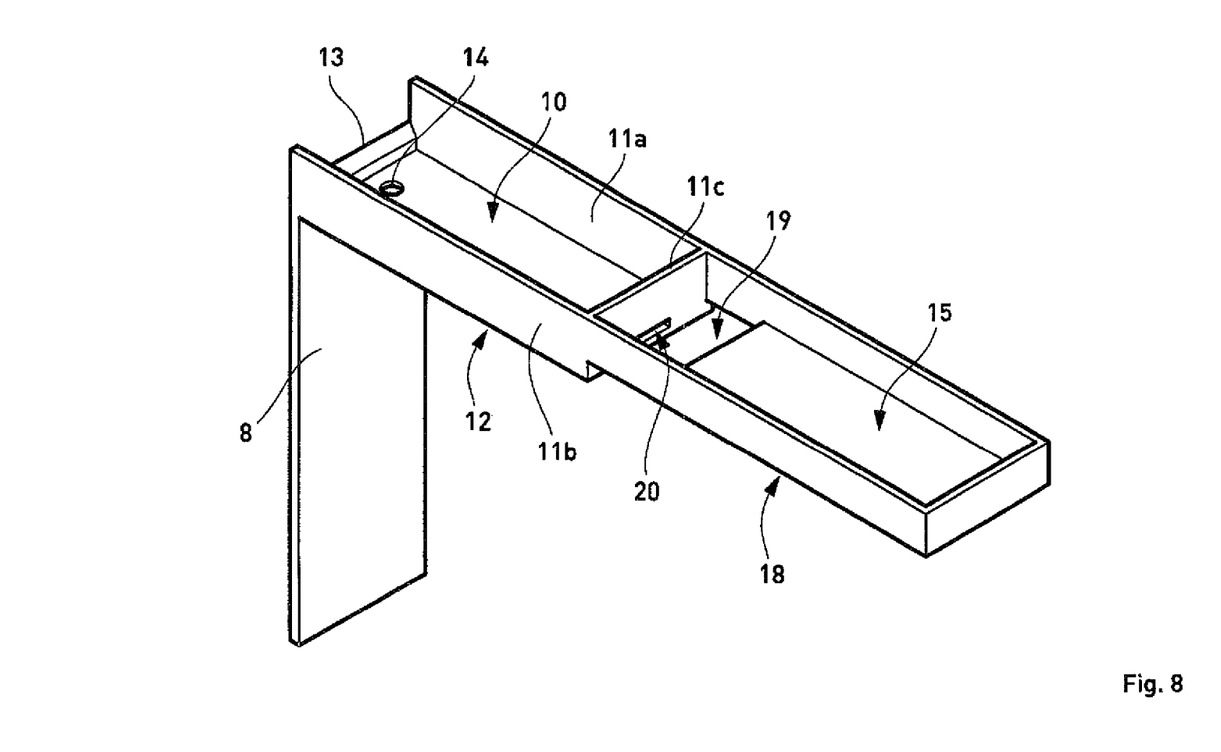
FIG. 8 shows a perspective view of an intermixing device with two mixing troughs in a second embodiment.

Adjacent the outflow port 9a, a mixing trough (10) is provided having sidewalls 11a, 11b, 11c and a bottom 12, wherein the side walls 11a, 11b are visible only in the perspective view of FIG. 8. The upper end of the flow channel plate 8 forms an overflow edge 13. The bottom 12 of mixing trough 10 is located always below the operationally determined minimum level 7b of battery acid 7 and provided with at least one bottom opening 14 of a predetermined cross section. Adjacent the mixing trough 10, an additional mixing through 15 with a bottom opening 16 is optionally provided for improved intermixing.

Following is a description of the function of the intermixing device.

FIG. 1 shows a battery at rest with a horizontal electrolyte level 7. It is assumed that an acid stratification has taken place in the battery, that is, the acid at the bottom of the battery has a higher density than the acid in the upper battery section and also that residing in the mixing trough.

Figure 2:
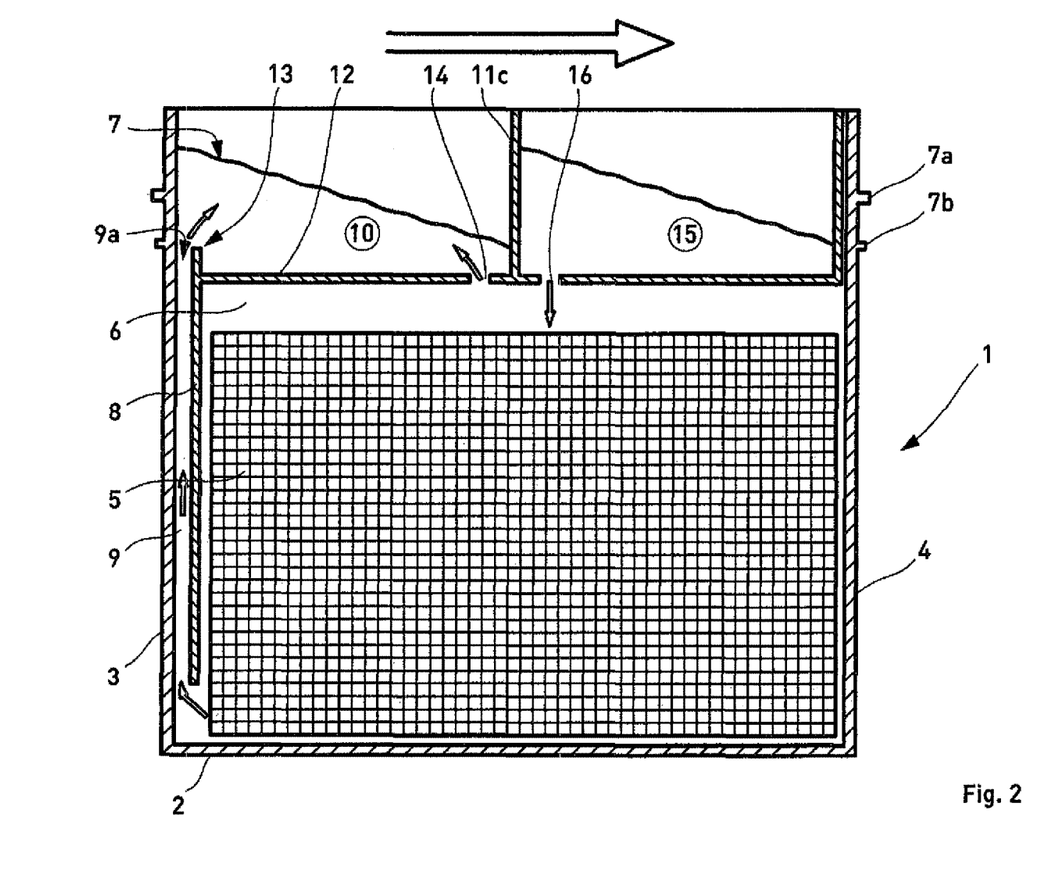
FIG. 2 shows the subject matter according to FIG. 1 and the acid levels in a second phase.

FIG. 2 shows the motion of the acid at a positive acceleration of the vehicle to the right in direction of the arrow. The same effect appears at a negative acceleration to the left, that is, upon braking the vehicle that moves in direction of the arrow. Thereby, a sloped acid level 7 occurs in the mixing trough 10. Through the flow channel 9 acid with greater density streams upwards and flows across the overflow edge 13 into the mixing trough 10. In this motion phase, acid of a lower density flows through the bottom opening 14 also into the mixing trough 10. As a result, in mixing trough 10 there is now a mixed acid that has a density that is lower than the acid density at the bottom of the battery but higher than the acid density in the area of the acid level.

From the optional mixing trough 15, due to the sloping acid level, some acid is guided upwardly through the bottom opening 16.

Figure 3:
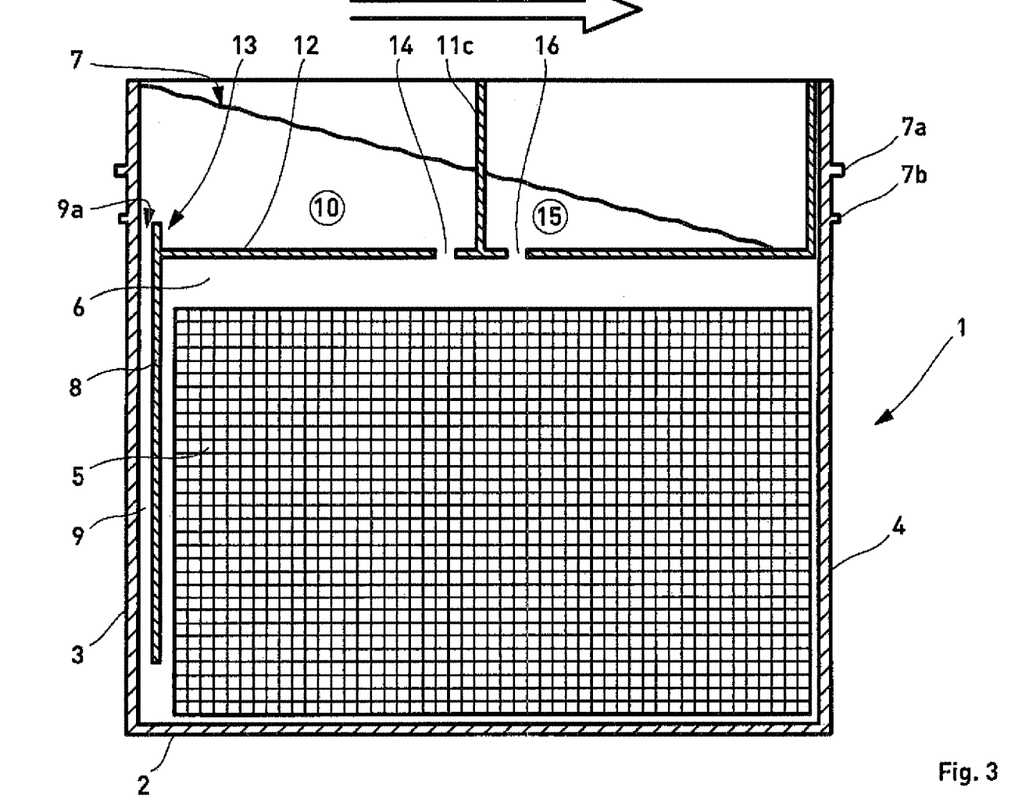
FIG. 3 shows the subject matter according to FIG. 1 and the acid levels in a third phase.

FIG. 3 illustrates the situation where the constant acceleration is still in effect, but where no equalizing streams occur any longer. This is indicted by the absence of the flow arrows.

Figure 4:
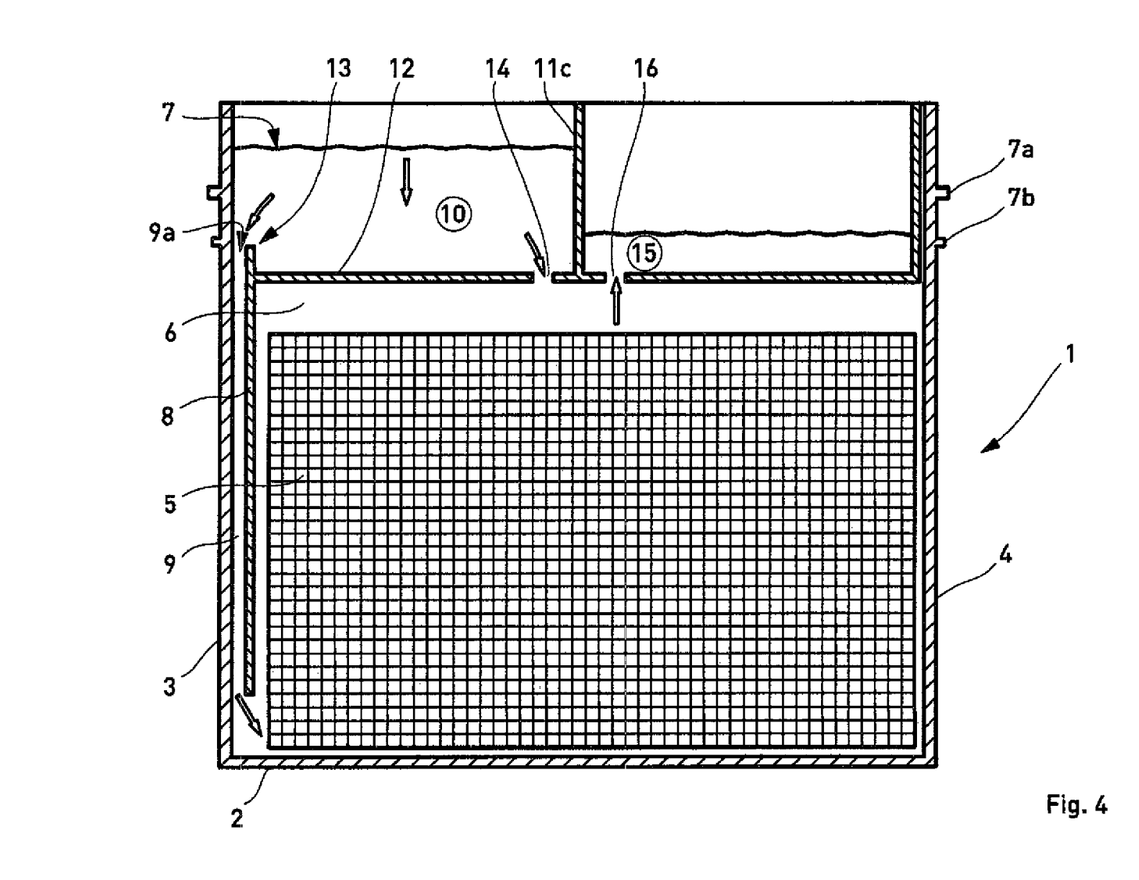
FIG. 4 shows the subject matter according to FIG. 1 and the acid levels in a fourth phase.

FIG. 4 illustrates the situation where the acceleration is equal to zero, that is, the vehicle is either driving at constant speed or is at a stand still. Accordingly, the acid levels are horizontal. The flow arrows indicate that equalizing of the acid level occurs via all three openings 9a, 14 and 16. It is especially emphasized that through the spatial distribution of the openings by which the acid is thus flowing into and out from these various points, a faster intermixing is realized.

Figure 5:
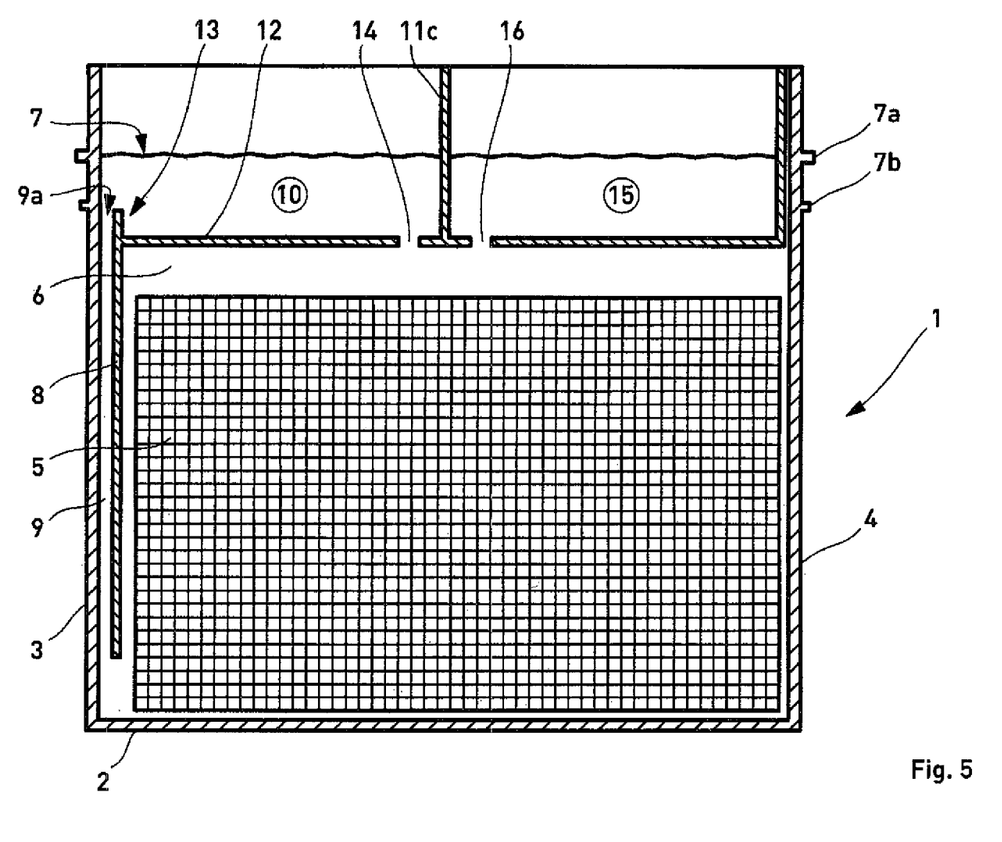
FIG. 5 shows the subject matter according to FIG. 1 and the acid levels in a fifth phase, which is identical to the first phase.

FIG. 5 illustrates the situation as in FIG. 1 where the levels have equalized though the acid is now intermixed.

Figure 6A:
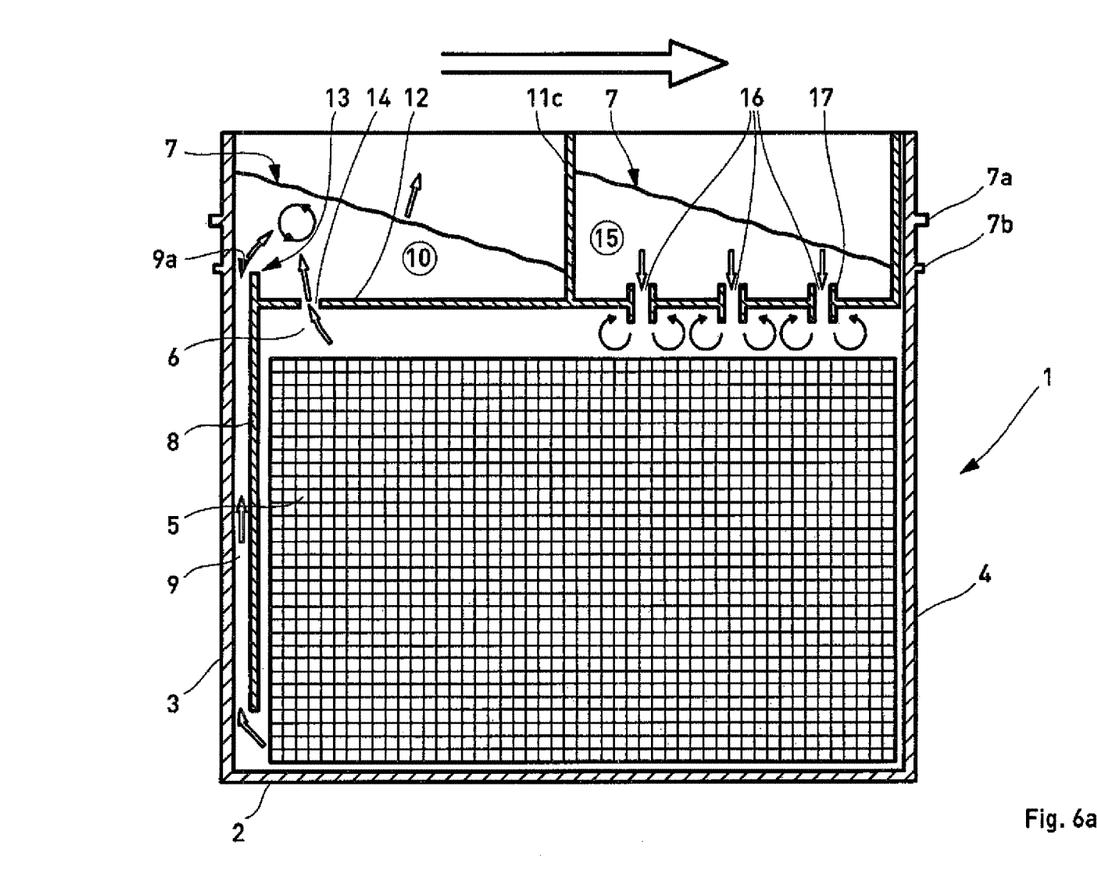
FIG. 6a,b shows the subject matter according to FIG. 1 in a modified embodiment and a top view thereof.
Figure 6B:
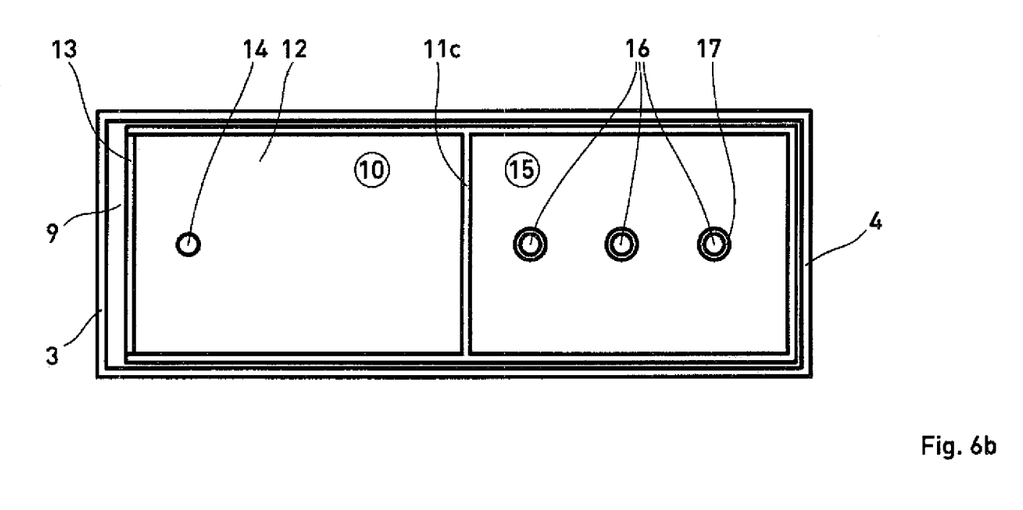

FIGS. 6a and 6b show a variant embodiment of the present invention in side view and in top view. In mixing trough 10, the bottom opening 14 is located near the outflow port 9a. This leads to an especially effective intermixing of the acid volumes of different densities that flow into each other and is symbolized with the ring arrow. Furthermore, three bottom openings 16 are provided in the second mixing trough. These openings are configured as small tubes inserted obliquely into the bottom in order to create a flow resistance and thus effect an additional turbulence and intermixing of the acid. This effect is further increased by the oblique position of the small tubes 17.

Figure 7:
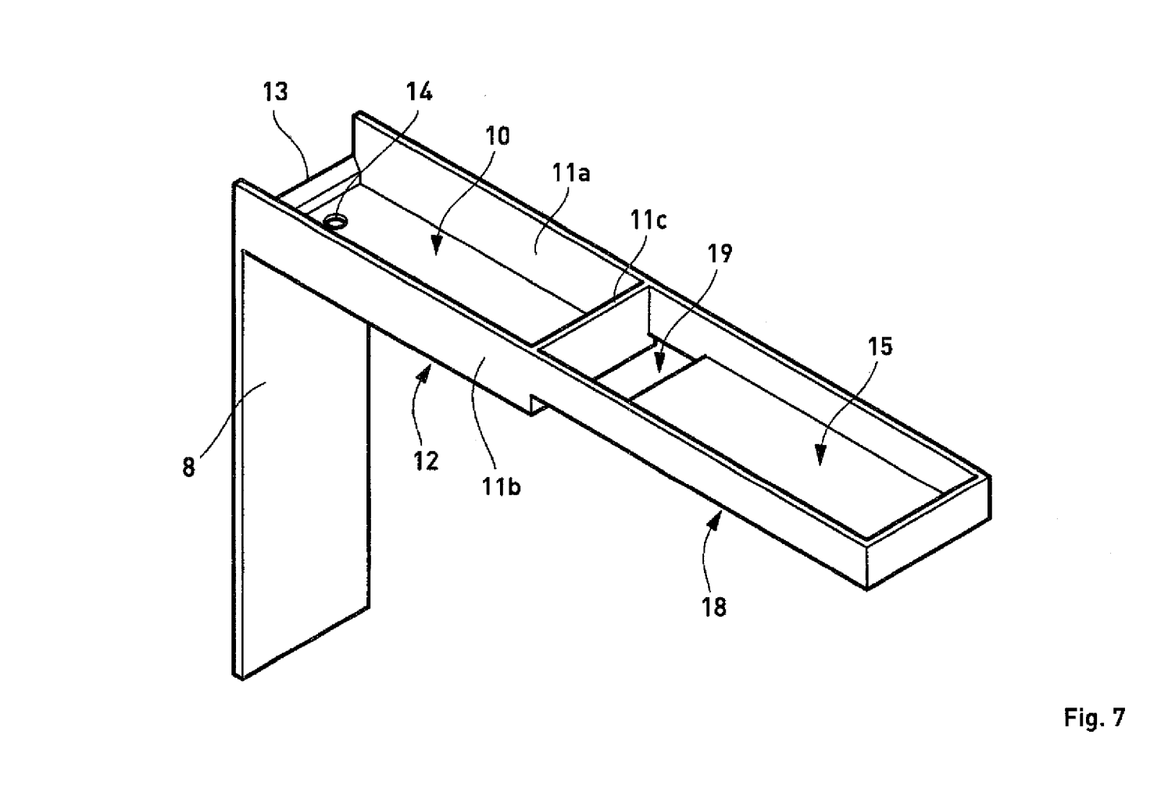
FIG. 7 shows a perspective view of an intermixing device with two mixing troughs.

FIG. 7 shows a perspective view of the intermixing device with two mixing troughs 10 and 15, wherein the bottom 18 of the second mixing trough 15 lies in the same plane as the maximum level of the battery acid and shows a recess 19.

FIG. 8 shows an intermixing device according to FIG. 7, which differs however in that the interior side wall of the first mixing trough 10 is provided with a slot shaped opening 20.

It is noted that the cross sections of the bottom and side openings of the first mixing trough 10 can be optimized by the person skilled in the art. The cross sectional shape of the bottom and side openings does not have to be circular. In conventional passenger motor vehicle batteries, the cross sections of the circular openings in the bottom and side walls correspond to a cross section of 1.2 to 10 mm and in truck batteries openings with a cross section of 5-20 mm.

Figure 9:
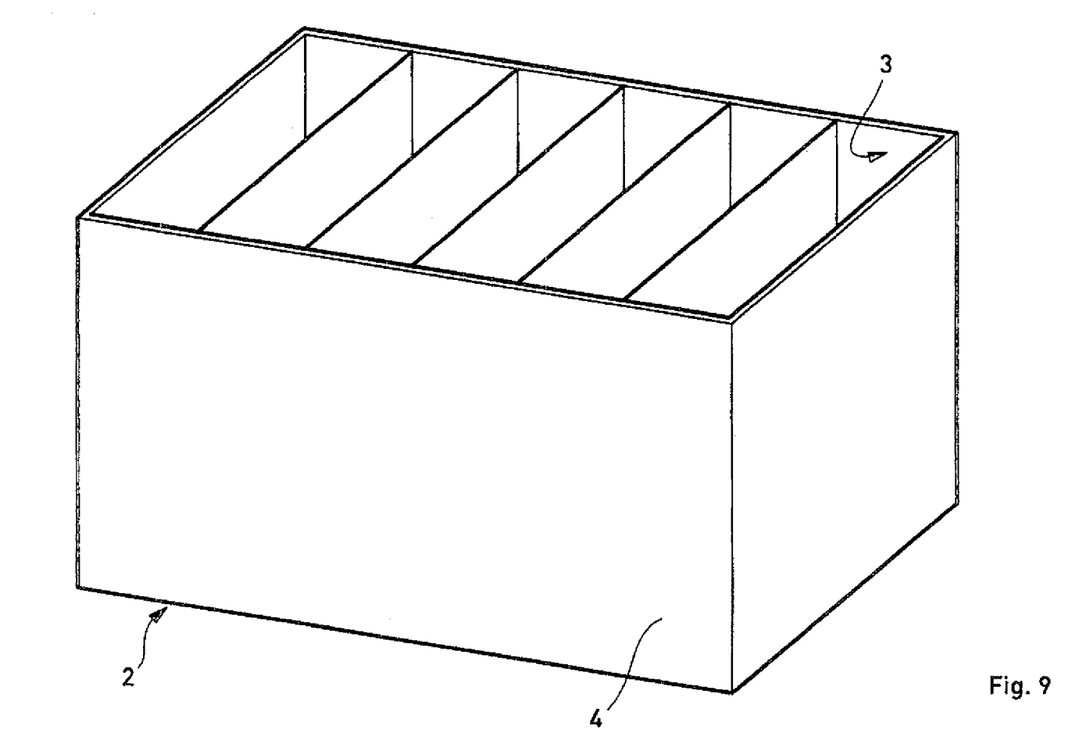
FIG. 9 shows a perspective view of an empty battery case with 6 cells.

FIG. 9 shows an empty battery case with 6 cells, wherein an intermixing device can be disposed in each cell, for example, according to FIG. 8.

What is claimed is:

1. A battery with an electrolyte intermixing device, said battery comprising:
   a battery housing carrying a liquid electrolyte whose level has predetermined tolerance limits;
   electrodes arranged within the liquid electrolyte;
   a flow channel plate disposed distanced from one side wall of the housing so that between the flow channel plate and the side wall, a flow channel is formed with a lower end thereof located in the lower third of a battery volume and at an upper end thereof having an outflow slot; and
   at least one mixing trough disposed above the electrodes, said mixing trough including a bottom located below a minimum level of the electrolyte provided for during operation of the battery and having at least one bottom opening and sidewalls, wherein one of the mixing trough side walls adjacent the outflow slot is configured as an overflow edge,
   said electrolyte being moved into and out of the mixing trough through the flow channel and the bottom opening in response to an acceleration of the battery,
   wherein an opening is provided in an interior facing side wall of the mixing trough.

2. The battery according to claim 1, wherein the bottom opening of the mixing trough is provided at a site where the liquid electrolyte, upon flowing across the overflow edge flows onto the bottom of the mixing trough.

3. The battery according to claim 1, further comprising a second mixing trough adjoining the interior facing side wall of the first mixing trough, said second mixing trough having a bottom which has at least one bottom opening.

4. The battery according to claim 3, wherein the bottom of the second mixing trough is located at an electrolyte maximum level, said second mixing trough located distant from the outflow slot.

5. The battery according to claim 1, wherein the flow channel plate is formed as a double-walled flow channel plate in the shape of a compressed tube with a slot-shaped hollow space cross section.

6. The battery according to claim 3, wherein the at least one bottom opening of the second mixing trough is configured as a small tube inserted in parallel into the bottom of the second mixing trough in order to create a flow resistance.

* * * * *